(12) United States Patent
Herault et al.

(10) Patent No.: US 11,312,497 B2
(45) Date of Patent: Apr. 26, 2022

(54) SEAT ARRANGEMENT, IN PARTICULAR FOR AN AIRPLANE

(71) Applicant: Safran Seats, Plaisir (FR)

(72) Inventors: Patrick Herault, Saint-Hilaire-en-Lignieres (FR); Bastien Bonnefoy, Issoudun (FR); Arthur Glain, Huntington Beach, CA (US); Eric Freienmuth, Marysville, WA (US)

(73) Assignee: Safran Seats, Plaisir (FR)

( * ) Notice: Subject to any disclaimer, the term of this patent is extended or adjusted under 35 U.S.C. 154(b) by 354 days.

(21) Appl. No.: 16/325,778

(22) PCT Filed: Aug. 17, 2017

(86) PCT No.: PCT/EP2017/070854
§ 371 (c)(1),
(2) Date: Feb. 15, 2019

(87) PCT Pub. No.: WO2018/033599
PCT Pub. Date: Feb. 22, 2018

(65) Prior Publication Data
US 2019/0210733 A1 Jul. 11, 2019

(30) Foreign Application Priority Data

Aug. 17, 2016 (FR) ....................................... 1657802
May 15, 2017 (FR) ....................................... 1770491

(51) Int. Cl.
*B64D 11/06* (2006.01)

(52) U.S. Cl.
CPC ...... *B64D 11/0641* (2014.12); *B64D 11/0601* (2014.12); *B64D 11/0604* (2014.12); *B64D 11/0606* (2014.12)

(58) Field of Classification Search
CPC ............ B64D 11/0601; B64D 11/0604; B64D 11/0606; B64D 2011/0069; B64D 11/0641; B64D 11/00; B64D 11/0023; E06B 3/481
See application file for complete search history.

(56) References Cited

U.S. PATENT DOCUMENTS 2,947,349 A * 8/1960 Kryter ................... B64D 11/00
297/174 R
4,597,549 A * 7/1986 Ryan ......................... B64C 1/10
160/127
(Continued)

FOREIGN PATENT DOCUMENTS

| EP | 1720766 | 11/2006 |
| WO | 2014115107 | 7/2014 |
| WO | 2014155353 | 10/2014 |

OTHER PUBLICATIONS

International Patent Application No. PCT/EP2017/070854, Written Opinion of the International Searching Authority dated Nov. 2, 2017 and English translation dated Jan. 4, 2019.
(Continued)

*Primary Examiner* — Medhat Badawi
(74) *Attorney, Agent, or Firm* — Kilpatrick Townsend & Stockton LLP (57) ABSTRACT

The invention relates to a seat arrangement, in particular designed to be installed in an airplane cabin, comprising:
at least one "front" seat and at least one "rear" seat, positioned one behind the other along a longitudinal axis of the airplane cabin and comprising respectively at least one seat that can pass from a "seating" position to a "bunk" position,
a transverse passage arranged between the "front" seat and the "rear" seat to allow access to an aisle, characterized in that the seat arrangement comprises movable (Continued)

closure means that can at least partially close off the transverse passage when the closure means are deployed.

14 Claims, 12 Drawing Sheets

(56) References Cited

U.S. PATENT DOCUMENTS

| | | | | |
|---|---|---|---|---|
| 5,024,398 | A * | 6/1991 | Riedinger | B64D 11/0015 244/118.5 |
| 5,214,885 | A * | 6/1993 | Maas | E04B 2/7427 52/239 |
| 5,238,282 | A * | 8/1993 | Watson | B60H 1/00592 296/24.41 |
| 6,059,364 | A * | 5/2000 | Dryburgh | A47C 1/0352 297/354.13 |
| 6,092,581 | A * | 7/2000 | Andersson | E06B 9/40 160/266 |
| 6,152,400 | A * | 11/2000 | Sankrithi | B64D 11/00 105/315 |
| 6,257,523 | B1 * | 7/2001 | Olliges | B61D 17/048 160/210 |
| 7,025,306 | B2 * | 4/2006 | Saint | B64D 11/0601 244/118.6 |
| 7,178,871 | B1 * | 2/2007 | Round | B64D 11/0606 297/244 |
| 7,188,806 | B2 * | 3/2007 | Beroth | B64D 11/06 244/122 R |
| 7,252,268 | B2 * | 8/2007 | Saint-Jaimes | B64D 11/00 244/118.6 |
| 7,275,716 | B2 * | 10/2007 | Saint-Jalmes | B64D 11/00 244/118.6 |
| 7,354,018 | B2 * | 4/2008 | Saint-Jalmes | B64D 11/00 105/315 |
| 7,578,470 | B2 * | 8/2009 | Plant | B64D 11/0606 244/118.6 |
| 7,665,694 | B2 * | 2/2010 | Hein | B64D 41/00 244/129.5 |
| 7,703,718 | B2 * | 4/2010 | Saint-Jalmes | B64D 11/00 244/118.6 |
| 7,721,990 | B2 * | 5/2010 | Jaeger | B64D 11/00 244/118.6 |
| D649,793 | S * | 12/2011 | Porter | D6/356 |
| 9,126,689 | B2 * | 9/2015 | Porter | B60N 3/004 |
| 9,266,614 | B2 * | 2/2016 | Henshaw | B64D 11/0605 |
| 9,308,997 | B2 * | 4/2016 | Scown | B64D 11/02 |
| 9,321,533 | B2 * | 4/2016 | Cuddy | B64D 11/04 |
| 9,409,648 | B2 * | 8/2016 | Eakins | B64D 11/0643 |
| 9,428,088 | B1 * | 8/2016 | Rajasingham | B64D 11/0619 |
| 9,688,407 | B2 * | 6/2017 | McIntosh | B64D 11/02 |
| 9,802,704 | B2 * | 10/2017 | Young | B64D 11/04 |
| 9,828,100 | B2 * | 11/2017 | Wyss | B64D 11/0601 |
| 9,849,985 | B2 * | 12/2017 | Mayer | B64D 11/0023 |
| 9,889,936 | B2 * | 2/2018 | Campbell | B64D 11/0601 |
| 10,233,659 | B1 * | 3/2019 | Holdredge | A47B 23/043 |
| 10,392,096 | B2 * | 8/2019 | Guering | B64D 11/02 |
| 10,556,689 | B2 * | 2/2020 | Lee | B64D 11/0601 |
| 10,703,483 | B1 * | 7/2020 | Rajasingham | B60N 2/34 |
| 10,843,801 | B2 * | 11/2020 | Malek | B64D 11/00 |
| 10,988,055 | B2 * | 4/2021 | Glain | B60N 2/643 |
| 2002/0084042 | A1 * | 7/2002 | Kimmet | E06B 9/0638 160/84.04 |
| 2003/0089269 | A1 * | 5/2003 | Oakley | B61D 19/02 105/397 |
| 2004/0173327 | A1 * | 9/2004 | Steel | E06B 3/50 160/210 |
| 2004/0232283 | A1 * | 11/2004 | Ferry | B60N 2/309 244/118.6 |
| 2007/0040434 | A1 * | 2/2007 | Plant | B64D 11/0643 297/354.13 |
| 2007/0170310 | A1 * | 7/2007 | Bock | B64D 11/0638 244/118.5 |
| 2007/0262625 | A1 | 11/2007 | Dryburgh et al. | |
| 2009/0302158 | A1 * | 12/2009 | Darbyshire | B64D 11/06 244/118.6 |
| 2010/0038484 | A1 * | 2/2010 | Ersan | B64D 11/0641 244/118.6 |
| 2010/0038485 | A1 * | 2/2010 | Harcup | B64D 11/06 244/118.6 |
| 2010/0065683 | A1 * | 3/2010 | Darbyshire | B64D 11/0601 244/118.6 |
| 2010/0065684 | A1 * | 3/2010 | Ruiter | B64D 11/0601 244/118.6 |
| 2010/0163674 | A1 * | 7/2010 | Bock | B64D 11/06 244/118.6 |
| 2010/0193634 | A1 * | 8/2010 | Hankinson | B64D 11/0605 244/118.6 |
| 2011/0210204 | A1 * | 9/2011 | Collins | B64D 11/0643 244/118.6 |
| 2011/0253838 | A1 * | 10/2011 | Bettell | B64D 11/0606 244/118.6 |
| 2012/0318918 | A1 * | 12/2012 | Johnson | B64D 11/06 244/118.6 |
| 2013/0020369 | A1 * | 1/2013 | Ple | B64D 11/0023 225/1 |
| 2013/0068887 | A1 * | 3/2013 | Ko | B65G 47/082 244/118.6 |
| 2013/0241247 | A1 * | 9/2013 | Wallace | B64D 11/06 297/118 |
| 2014/0035330 | A1 * | 2/2014 | Henshaw | B64D 11/0606 297/174 R |
| 2014/0123571 | A1 * | 5/2014 | Swain | E06B 9/0638 52/79.1 |
| 2015/0360783 | A1 * | 12/2015 | Cailleteau | B64D 11/06 244/118.6 |
| 2016/0059966 | A1 * | 3/2016 | Dryburgh | B64D 11/00 244/118.6 |
| 2016/0083092 | A1 * | 3/2016 | Long | B64D 11/02 160/213 |
| 2016/0123065 | A1 * | 5/2016 | Mori | E05F 15/42 49/28 |
| 2016/0194068 | A1 * | 7/2016 | Savian | B64C 1/1469 160/213 |
| 2016/0257408 | A1 * | 9/2016 | Gill | B64D 11/0606 |
| 2017/0130518 | A1 * | 5/2017 | Christenson | B64C 1/1423 |
| 2019/0329891 | A1 * | 10/2019 | Bonnefoy | B64D 11/0606 |

OTHER PUBLICATIONS

International Patent Application No. PCT/EP2017/070854, International Search Report, dated Nov. 2, 2017.

* cited by examiner

SEAT ARRANGEMENT, IN PARTICULAR FOR AN AIRPLANE

CROSS REFERENCE TO RELATED APPLICATIONS

This application is the national phase under 35 U.S.C. § 371 of International Patent Application No. PCT/EP2017/070854, filed on Aug. 17, 2017, which application claims priority benefits of French Patent Application No. 1657802, filed on Aug. 17, 2016 and French Patent Application No. 1770491, filed on May 15, 2017, all of which applications are incorporated herein in their entireties by this reference.

BACKGROUND

The present invention relates to a seat arrangement, in particular of the seats of passengers of a transportation vehicle, in particular an airplane. The invention is to propose such seating arrangement which ensures the comfort and the safety of the passengers at the same time, while aiming to preserve their privacy. The invention thus encounters a particularly advantageous application in the case of airplane seats.

The "Businesses Class" seats of an airplane offer the passengers various comfort positions, from a "seated" to a "bunk" position, in which the seat assumes the position of a nearly horizontal bed so that the passenger can stretch out.

Intermediate comfort positions, such as the "relaxed" position in which the back is strongly inclined, are also proposed. These intermediate positions are generally attained by way of the back rest pivoting about an axis that is horizontal and perpendicular to an extension axis of the seat. The passenger can then remain in the seat during the transitions between the various positions.

The sleeper berth generally consists of the back, the seat, a leg rest and a footrest, the latter being attached or tied to the kinematics of the seat.

Certain configurations of the seats for the "Business Class" cabin of an airplane allow for direct access to an aisle for all the passengers by means of a passage disposed between two seats that are arranged one behind the other along a longitudinal axis of the airplane cabin. The passengers can thus easily leave their seat, particularly when the seat is in the "bunk" position.

So when a passenger or a crew member walks in an aisle located laterally with respect to the seat, particularly toward the back of the airplane's cabin, he is probably in direct visual contact with a passenger sitting in a seat. This can bring about a feeling of discomfort for the sitting passenger, in the sense that he feels an absence of privacy.

SUMMARY

This invention mainly seeks to effectively remedy this problem by proposing an arrangement of seats, particularly designed for installation in an airplane cabin, comprising:
  at least one "front" seat and at least one "back" seat located one behind the other along a longitudinal axis of the airplane cabin and respectively comprising at least one seat that is capable of changing from a "seated" to a "bunk" position,
  a transverse passage disposed between the "front" seat and the "back" seat so as to allow access to an aisle, characterized in that the seat arrangement includes movable means of closing, capable of at least partially closing off the transverse passage when the means of closing are deployed.

The invention thus makes it possible to delimit a closed interior space around the seat, giving the passenger a sense of privacy while shielding him from direct view by the other passengers and/or crew members walking in the aisle.

According to one embodiment, the seat is turned towards an aisle of the airplane cabin.

According to one embodiment, the means of closing comprise at least one, in particular, rigid or flexible sliding wall.

According to one embodiment, the means of closing comprise a first wall that can slide in a first deployment direction between
  a "stowed" position, and
  a "deployed" position, in which the first wall closes off at least a part of the transverse passage between the "front" and the "back" seats.

According to one embodiment, the means of closing comprises a second wall that can slide in a second direction of deployment between
  a "stowed" position, and
  a "deployed" position, in which the second wall closes off at least a part of the transverse passage between the "front" and the "back" seats.

According to one embodiment, the second direction of deployment of the second wall is opposite to the first direction of deployment of the first wall.

According to one embodiment, the seat is equipped with a first wall and a second wall that are movable with respect to the seat.

According to one embodiment, the first wall and the second wall are located on both sides of an intermediate wall, in particular consisting of a portion of a fixed shell of the seat.

According to one embodiment, the first wall is connected to at least one slide interacting with a fixed rail on the intermediate wall and/or the second wall is connected to at least one slide interacting with a rail affixed to the intermediate wall.

According to one embodiment, the intermediate wall has a wavy form defining grooves, with two successive grooves being open along two opposite directions, with the rails of one of the walls, from among the first or the second wall, being inserted into the open grooves in the direction of the seat and the rails of the other the wall from among the first and the second walls being inserted into grooves that are in a direction opposite to the seat.

According to one embodiment, a cover extends above at least one respective rail in order to avoid the risk of pinching one's fingers when handling the first wall or the second wall.

According to one embodiment, a lower part of the first and/or the second wall is housed in a side panel of the corresponding respective seat when the first wall and/or the second wall are in the stowed position.

According to one embodiment, the first wall and the second wall are movable in a translational or rotational manner, or in a combined movement comprising at least one translation and at least one rotation.

According to one embodiment, the means of closing comprises at least one blackout curtain.

According to one embodiment, the curtain is installed on a movable articulated support between
  a "stowed" position, in which the curtain is located inside the "front" seat, in particular inside the rigid shell of the "front" seat, and
  a "deployed" position, in which the curtain closes off at least part of the cross passage.

According to one embodiment, the support is movable with respect to the "front" seat in a translational and rotational manner, so as to pass from the "stowed" position to the "deployed" position.

According to one embodiment, the curtain is installed on a slide-in frame between
- a "stowed" position, in which the curtain is located inside the "front" seat, in particular inside the rigid shell of the "front" seat, and
- a "deployed" position, in which the curtain closes off at least part of the cross passage.

According to one embodiment, the means of closing comprises a first curtain and/or a second curtain, that can, e.g., be rolled up, and in particular installed in the "front" seat, with the first curtain, when it is unrolled, making it possible to close off at least a part of the cross passage, in particular a lower part of the cross passage, and/or with the second curtain, when it is unrolled, making it possible to close off at least a part of the cross passage, in particular an upper part of the cross passage.

According to one embodiment, the means of closing comprises at least two walls that are, at least to some extent, movable with respect to each other and can be deployed in the same direction of deployment or in two distinct directions.

The various characteristics, alternatives and/or embodiments of this invention can of course be combined with each other in various combinations insofar as they are not incompatible or mutually exclusive.

BRIEF DESCRIPTION OF THE DRAWINGS

The present invention will be better understood and other characteristics and advantages will become clear upon reading the following detailed description including embodiments provided for purely illustrative purposes with reference to the attached figures presented as non-limitative examples, which may fulfill an understanding of this invention and the disclosure of its realization and, if necessary, contribute to its meaning, wherein.

DETAILED DESCRIPTION

It should be noted that, in the figures, the structural and/or functional elements that are common to the various embodiments can have the same reference numbers. Thus, unless otherwise mentioned, such elements have identical structural, dimensional and material properties.

Figure 1:
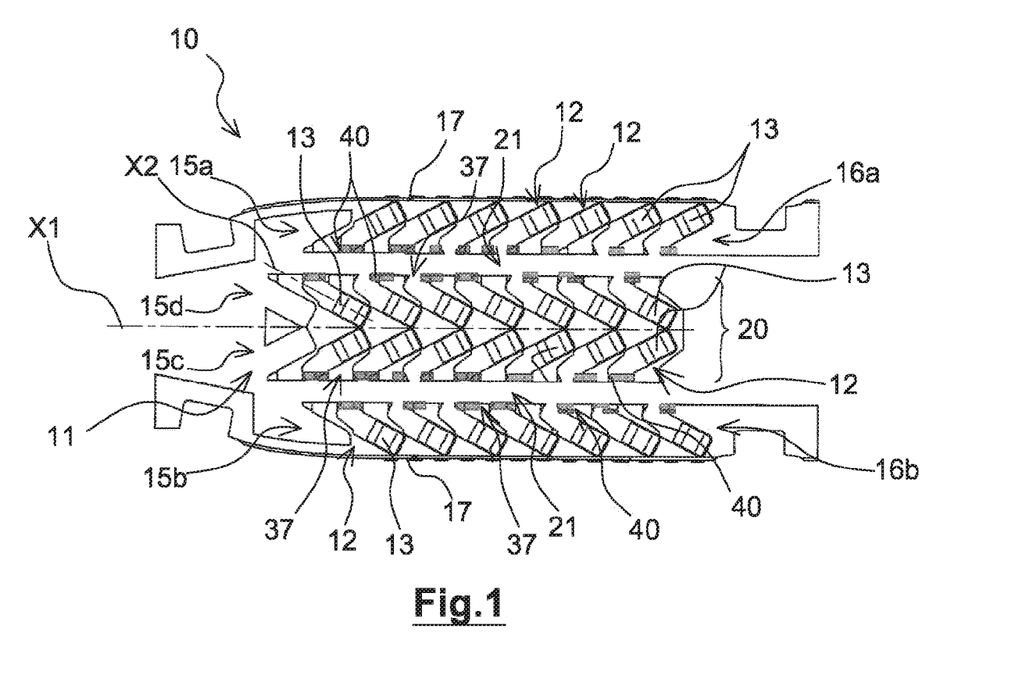
FIG. 1 is a schematic top view of an airplane cabin including a seating arrangement according to the present invention.

FIG. 1 shows an airplane cabin 10 extending along a longitudinal axis X1, comprising a seat arrangement 11. The seat arrangement 11 according to the present invention includes numerous seats 12 respectively comprising an individual seat 13. The seat 13 can advantageously go from a "seated" position, corresponding to the position particularly used when the airplane is stopped, taking off and landing, and a "bunk" position in which seat 13 is in a nearly horizontal bunk position of a bed for the passenger. The "seated" and the "bunk" positions constitute seating configurations 13 in two extreme positions. According to alternative embodiments, the seat 13 can also assume intermediate positions, known as relaxed positions, between these two extreme positions.

Most of the seats 12 are disposed along at least a line 15a preferably extending along the longitudinal axis X1 from the airplane cabin 10. According to the example shown in FIG. 1, most of the seats 12 are ideally disposed along four lines 15a, 15b, 15c and 15d.

According to various particular embodiments, the seats inside the line 15a, respectively the lines 15a, 15b, 15c and 15d, 12, can be oriented in such a way that the seat 13 is turned toward the front and/or towards the back of the airplane.

It should be noted that, in the rest of the description, the terms "front" and "back" used in connection with the expression 'seat' locally define a relative position of a seat 13 within the line 15a, respectively the lines 15a, 15b, 15c and 15d, and do not refer at all to an orientation of seats 13 inside the airplane cabin 10. In other words, the expression '"front" seat' means that the seat is positioned directly in front of another seat within the line, while the expression '"back" seat' means that the seat is positioned directly behind another seat within the line.

According to the example embodiment that is shown, the seat arrangement 11 comprises two side groups 16a, 16b comprising the seats 12. The two side groups 16a, 16b are respectively constituted of two lines 15a, 15b of seats 12 situated along a side wall 17 of the fuselage of the airplane cabin 10. The seating arrangement 11 also comprises a center group 20. The center group 20 preferably consists of two lines 15c, 15d of seats 12. In such a layout, the two lines 15c, 15d of seats 12 are particularly aligned laterally with respect to one another.

The side groups 16a, 16b are respectively separated from the center group 20 by an aisle 21. In the configuration shown in FIG. 1, the airplane cabin 10 thus has two aisles 21, specifically between each side group 16a, 16b and the center group 20. As an alternative, the two side groups 16a, 16b can each be constituted by several lines of seats 12.

Each seat 13 has an extension axis X2 substantially corresponding to a longitudinal direction of extension of a seat 13. The extension axis X2 corresponds to the direction of longitudinal extension of a seat 13 in the "bunk" position. The extension axis X2 advantageously forms a non-zero angle with the longitudinal axis X1 of the airplane cabin 10.

According to a particular layout, each seat 13 is turned towards the aisle 21 adjacent to the line 15a, respectively the lines 15a, 15b, 15c and 15d. When disposed in this way, each passenger has direct access from the seat 13 to the aisle 21. Moreover, direct access to the aisle 21 is facilitated by the fact that the passenger's feet face the side of the aisle 21.

Moreover, two seats 12 in the center group 20 are ideally disposed so that they are laterally contiguous with respect to one another. The two seats 12 advantageously have seats 13 that extend in two different directions. The respective axes of extension X2 of the two seats 12 preferably form an acute angle. This configuration is such that the two seats 12 form a "V." A "V" shaped apex of the two seats 12 is in particular located behind respective backrests 24 of the two seats 12.

An optimization of the density of occupation of an airplane cabin 10 with respect to the width thereof is in particular possible by modifying the angle of the extension axis X2 of seats 13 with respect to the longitudinal axis X1 of the airplane cabin 10.

According to various embodiments, the extension axes X2 of the seats 13 can essentially form the same angle with respect to the longitudinal axis X1 of the airplane cabin 10. Moreover, the extension axes X2 of two adjacent seats 13 of the center group 20 can essentially intersect the longitudinal axis X1 of the airplane cabin 10 at the same point. Lastly, two laterally adjacent seats 13 can alternatively be displaced with respect to one another along the longitudinal axis X1 so that the extension axes X2 of two laterally adjacent seats 13 intersect the longitudinal axis X1 at different points.

In the example that is shown, seats 13 are oriented towards the front of the airplane cabin 10, i.e. in the direction of a zone including the cockpit of the airplane. In an alternative embodiment, the seats 13 are oriented towards the back of the airplane cabin 10, i.e. in the direction opposite to the zone including the cockpit of the airplane.

Figure 6:
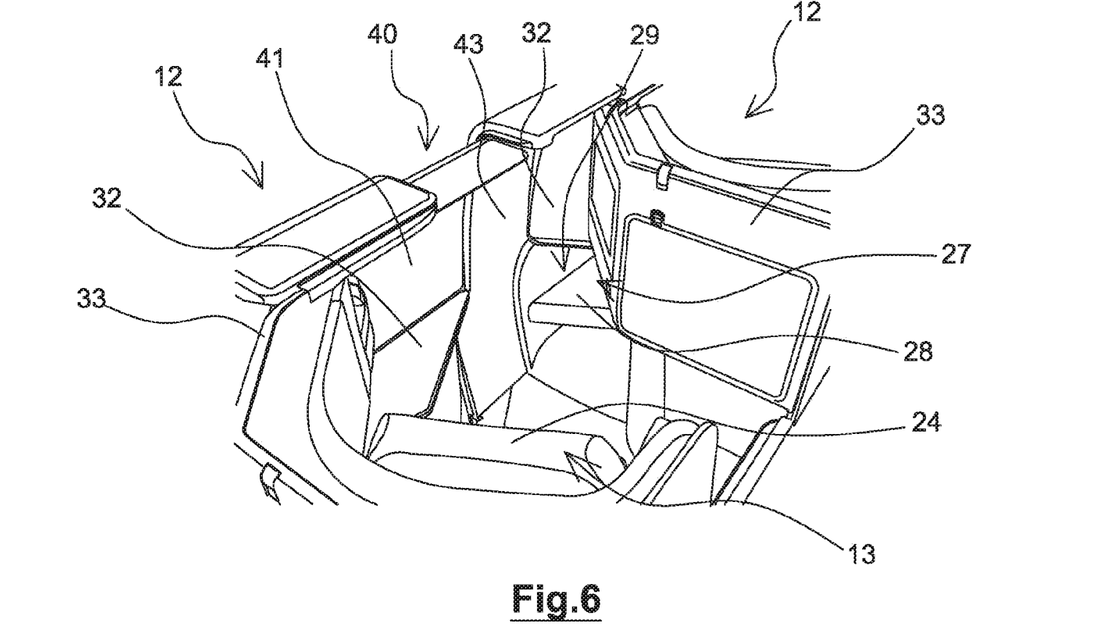
FIG. 6 is a perspective rear view of the seat according to the present invention with the means of closing deployed.
Figure 7A:
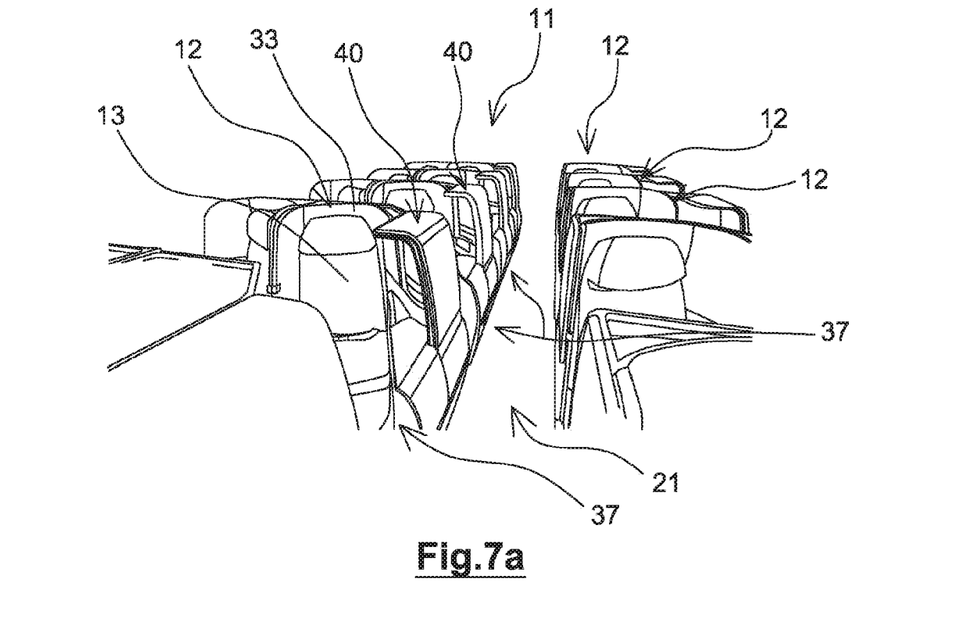
FIGS. 7a to 7c are perspective front views of the airplane cabin illustrating the deployment for the means of closing according to the present invention.
Figure 7B:
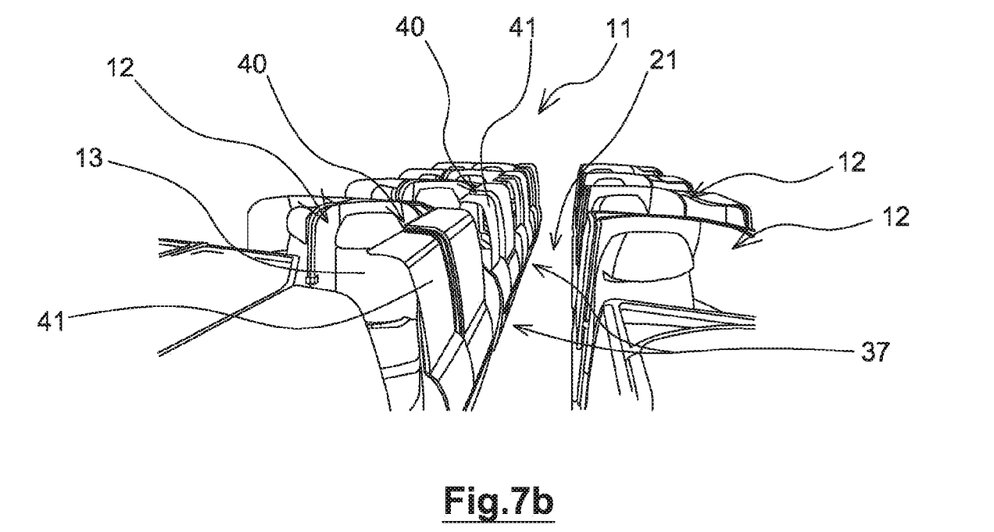
Figure 7C:
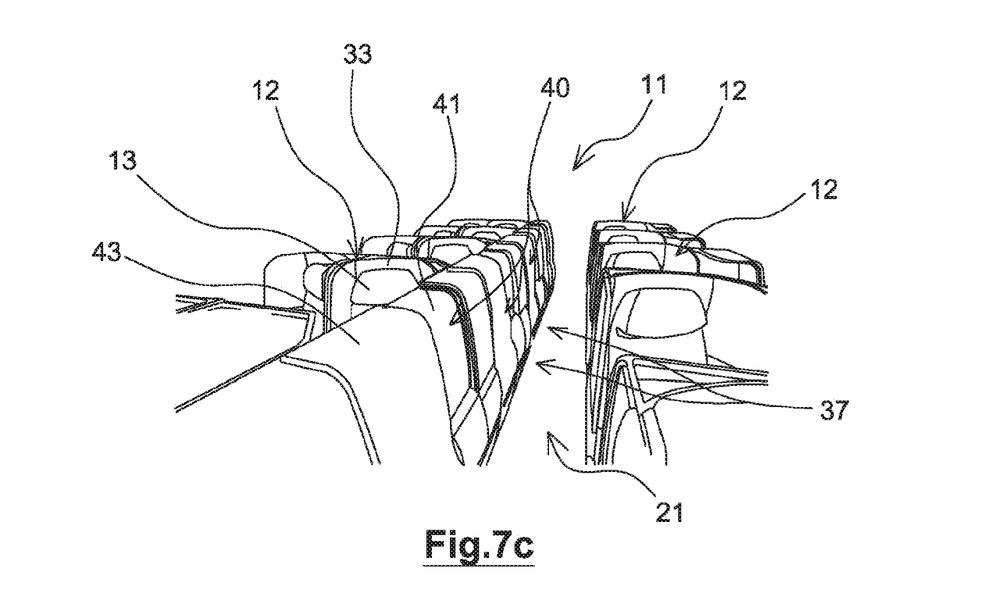

As described above and particularly as illustrated by FIG. 2, each seat 12 thus has a seat bottom 13. According to an advantageous embodiment, the seat 13 includes a backrest 24 whose tilt is adjustable and a seat bottom 25 whose tilt is potentially adjustable. Moreover, the seat 13 can include a foot rest 26 whose tilt is adjustable. The seat 12 can moreover include a footrest 27 as shown in FIG. 6.

According to an alternative, the footrest 27 can consist of a fixed cushion 28, which is particularly disposed in a recess 29 and is intended to receive the passenger's feet. The fixed cushion 28 of the footrest 27 is preferably located in the extension of the seat 13 when latter is in the "bunk" position.

The footrest 27 can alternatively consist of an element located at the end of leg rest 26.

Figure 2:
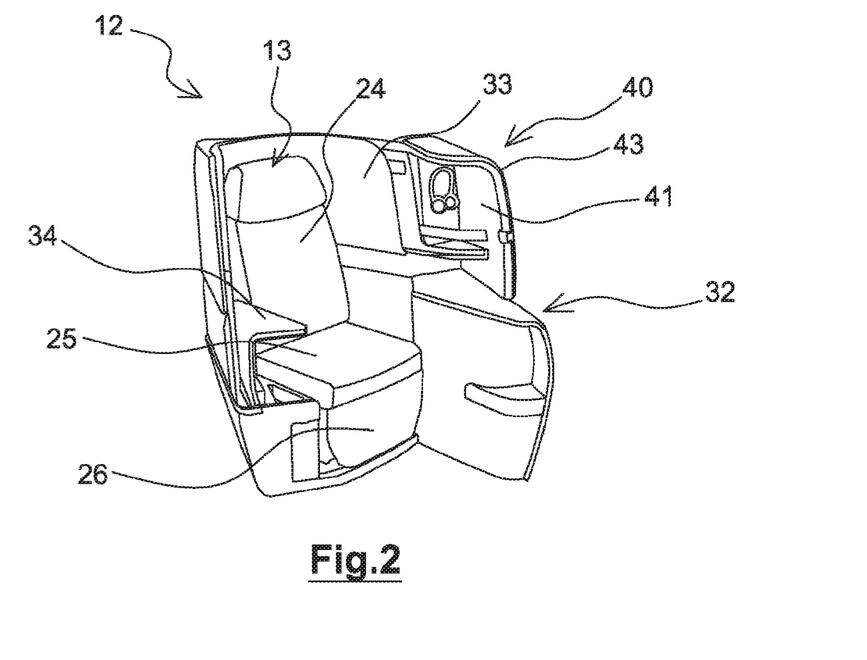
FIG. 2 is a perspective front view of a seat comprising a means of closing according to the present invention.

The seat 12 can also comprise a side panel 32 that can in particular serve as a fixed shelf and/or to store a meal tray.

The seat 12 can also comprise a fixed shell 33 that is able to provide for separation. Such a fixed shell 33 thus makes it possible to ensure the privacy of each passenger. In order to provide such a privacy ensuring feature, the fixed shell 33 advantageously extends around the back 24 of the seat 13 in order to create an interior space that is fully or partly enclosed in which the seat 13 is located.

When two seats 12 are positioned one behind the other, the two seats 12 are advantageously arranged so as to set up an at least partial vertical cover between them. According to an alternative embodiment, the vertical cover between the two seats 12 can, as shown, consist of placing the recess 29 of the footrest 27 of the "back" seat 12 under the side panel 32 of the corresponding "front" seat 12.

The seat 12 can moreover include an armrest 34. The armrest 34 can be retractable so that it is movable between a "raised" position in which the armrest 34 is able to support part of the passenger's body, in particular one of the passenger's arms, and a "stored" position in which the armrest 34 can be located at the same level as base 25 of the seat 13, in particular when the latter is in the sitting position. The passenger will thus be able to benefit from comfort positions by, for example, placing a part of his body, in particular a leg, on the armrest 34 in the "stored" position.

The seat 12 can moreover possibly comprise a fixed cushion (not shown). The fixed cushion particularly allows for a maximization of the bunk. For that purpose, it is advantageously to be positioned in a seat extension 13, in particular a lateral extension, when the latter is in the "bunk" position.

As can particularly be seen in FIG. 1, a transverse passage 37 is disposed between two consecutive seats 12 of a line 15a, respectively the lines 15a, 15b, 15c and 15d, i.e. a "front" seat 12 and a "rear" seat 12. More specifically, according to the example embodiment shown, the transverse passage 37 extends between the "rear" seat 12 and the rigid shell 33 of the "front" seat 12.

The transverse passage 37 is disposed so as to allow the passenger to move from the seat 13 to the aisle 21, particularly when the seat 13 is in the "bunk" position.

According to the present invention, the means of closing 40, in particular the removable means of closing 40 are disposed in the transverse passage 37. The means of closing 40 provide for the closing of the transverse passage 37. Such means of closing 40 thus make it possible to establish a closed space around the seat 13, in particular together with the rigid shell 33 of the seat 12.

Figure 3A:
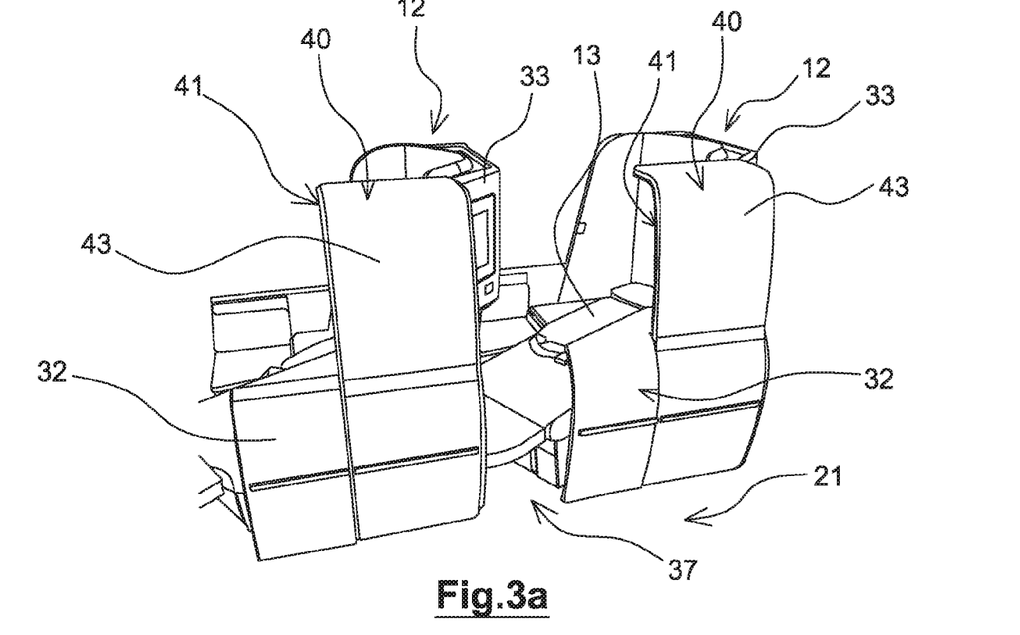
FIGS. 3a to 3c are perspective side views illustrating the means of closing according to the present invention in various stages of deployment.
Figure 3B:
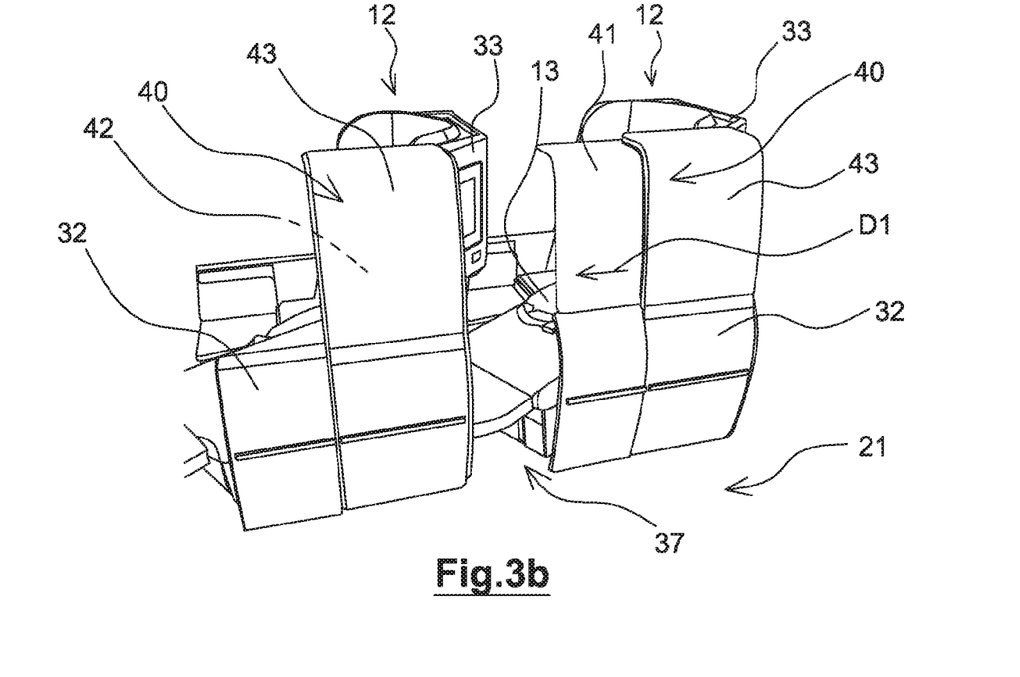
Figure 3C:
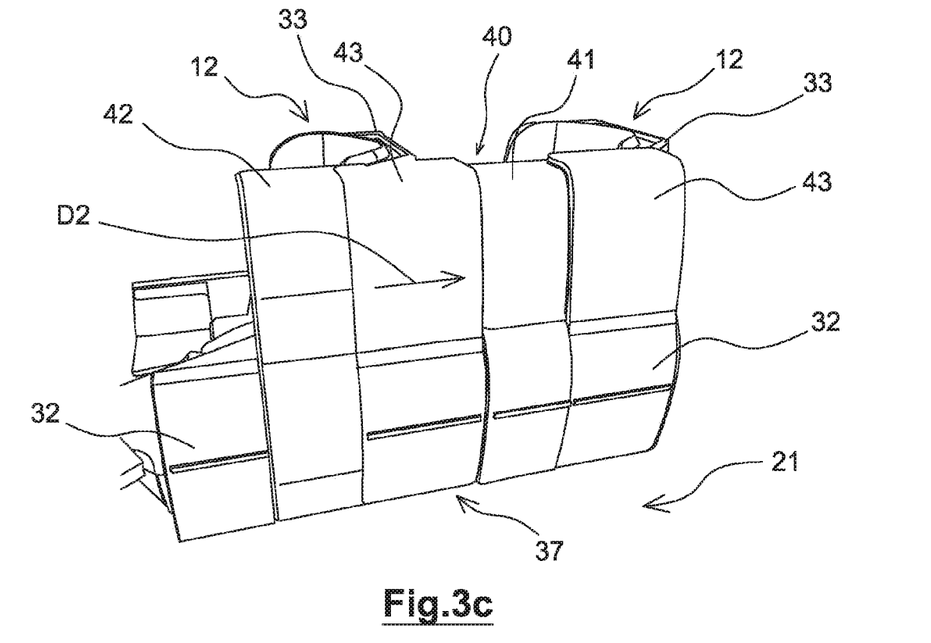

When the means of closing 40 are deployed, particularly as shown in FIGS. 3c and 6, the transverse passage 37 located between two consecutive seats 12 of the line 15a, respectively the lines 15a, 15b, 15c, 15d, is closed by a means of closing 40, such as for example walls and/or curtains.

The passenger sitting in a seat 13 is consequently separated from any passenger and/or crew member walking in the aisle 21 by the means of closing 40 as well as the fixed shell 33 extending around seat 13. The passenger is thus seated in a privacy zone defined by closed space that is created in this way.

In the embodiments shown in FIGS. 3a to 7c, the means of closing 40 comprise at least a first wall 41. The first wall 41 in particular extends in a nearly vertical plane.

The first wall 41 is moreover preferably able to slide in a first direction D1 with respect to the seat 12, in particular with respect to an intermediate wall 42 of the seat 12, in particular the intermediate wall 42 of the of the "rear" seat 12.

The first wall 41 is thus movable between:
- a "stowed" position, in which the first wall 41 at least partially overlaps the intermediate wall 42 of the seat 12, in particular the intermediate wall 42 of the "rear" seat 12, along the longitudinal axis X1 of the airplane cabin 10, as shown in FIG. 3a, and
- a "deployed" position, in which the first wall 41 closes off all or a part of the transverse passage 37 between the "front" seat 12 and the "back" seat 12, as shown in FIG. 3b.

The first wall 41 particularly extends along a nearly vertical plane. According to an alternative of this invention, the means of closing 40 comprise at least a second wall 43.

Moreover, the second wall 43 is preferably able to slide in a second direction D2 with respect to the seat 12, in particular with respect to the intermediate wall 42 of the seat 12, in particular the intermediate wall 42 of the "front" seat 12.

The second wall 43 is thus movable between:
- a "stowed" position, in which the second wall 43 at least partially overlaps the intermediate wall 42 of the seat 12, in particular the intermediate wall 42 of the "front" seat 12, along the longitudinal axis X1 of the airplane cabin 10, as shown in FIG. 3b, and
- a "deployed" position, in which second wall 43 closes off all or a part of the transverse passage 37 between the "front" seat 12 and the "rear" seat 12, as shown in FIG. 3c.

According to an example embodiment, the second direction D2 in which the second wall 43 moves is opposite to the first direction D1 in which the first wall 41 moves. The first direction D1 and the second direction D2 are preferably parallel to the longitudinal axis X1 of the airplane cabin 10.

More particularly, the parts of the transverse passage 37 blocked by the first wall 41 and the second wall 43 advantageously complement one another along the longitudinal axis X1, so that the transverse passage 37 is blocked along its entire longitudinal extent.

In particular, according to an alternative of this invention, the first wall 41 can also close off a space located above the side panel 32 of the "rear" seat 12. Moreover, the second wall 43 can also close off the remainder of the transverse passage 37 between the two seats 12.

When the first wall 41 and the second wall 43 are moved into the "deployed" position, the first wall 41 and the second wall 43 include borders that are preferably nearly contiguous. The borders of the first wall 41 and the second wall 43 may be slightly spaced with respect to each other.

Figure 9:
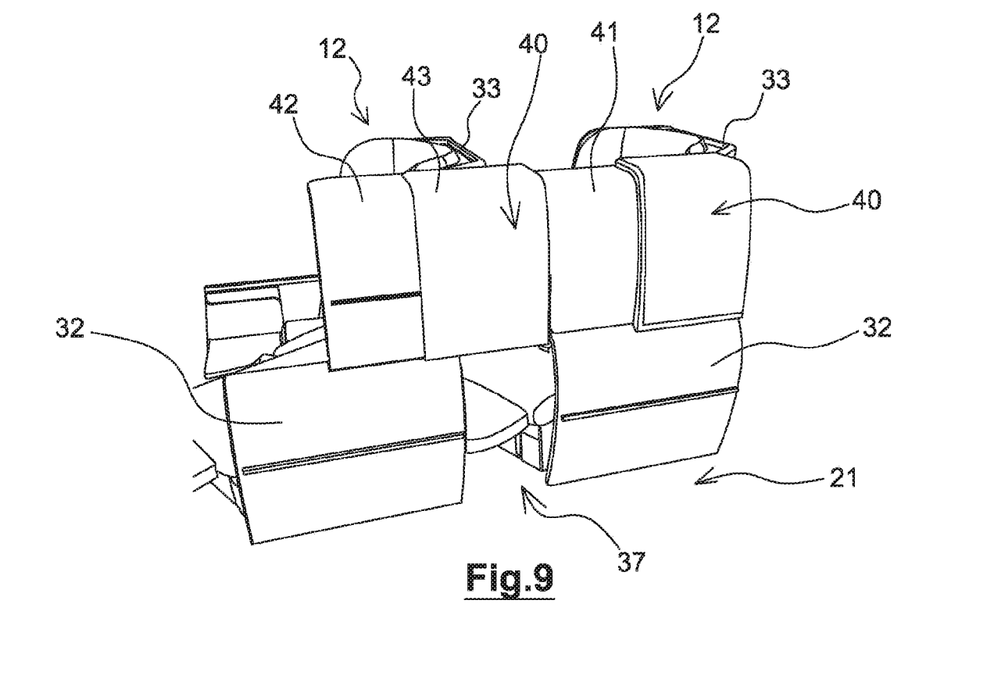
FIG. 9 is a perspective side view of another alternative embodiment of the means for closing that only closes off a part of the passage of the seat according to the present invention.

In the embodiment of FIGS. 3a to 3c and 7a to 7c, the first wall 41 extends only over a high part of the seat 12. In such a configuration, a portion of a low part of the transverse passage 37 is blocked off by the side panel 32. In addition, the second wall 43 extends over a high part and a low part of the seat 12. The second wall 43 alternatively extends only over a high part, as shown on FIG. 9.

According to an alternative configuration, the seat 12 is equipped with a first wall 41 and/or a second wall 43 which is/are installed so that it/they can slide with respect to an intermediate wall 42 which is advantageously fixed with respect to the seat 12.

Figure 4:
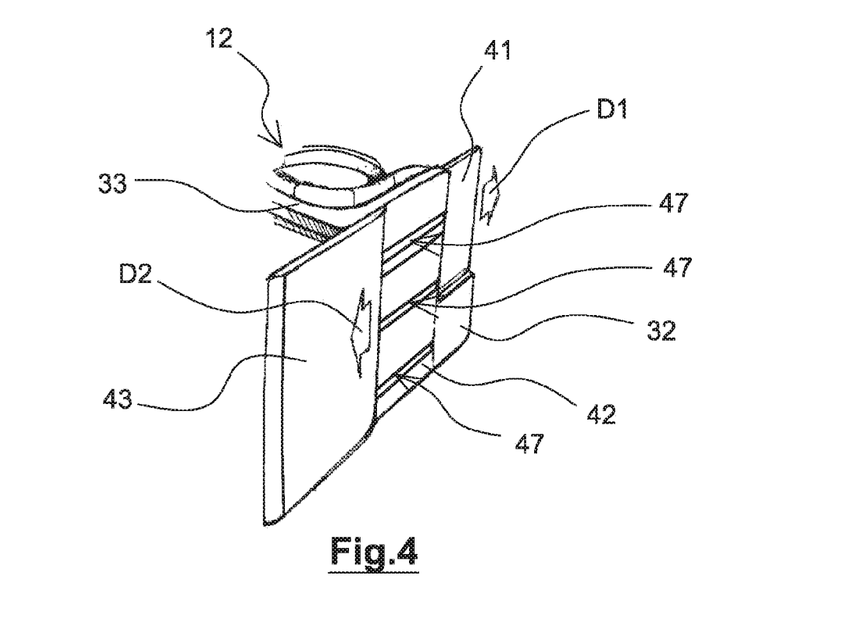
FIG. 4 is a partial perspective view of the seat according to the present invention illustrating a displacement of the two walls of the means of closing in two opposite directions.
Figure 5:
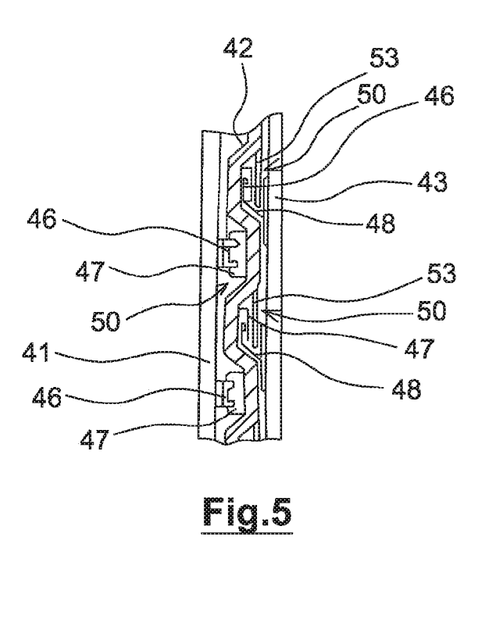
FIG. 5 is a partial cross-sectional view illustrating a mechanical connection between walls of the means of closing and a fixed intermediate wall of the seat according to the present invention.

According to the example embodiment shown in FIGS. 4 and 5, the first wall 41 and the second wall 43 are located on alternative sides of the intermediate wall 42. The first wall 41 and the second wall 43 are respectively interdependent, with at least one slide 46 cooperating with at least one rail 47 that is in particular affixed to the intermediate wall 42. To this end, the first wall 41, respectively the second wall 43, can comprise a bracket 48 providing for the connection between the first wall 41 or the second wall 43 with the slide rail 46.

The seat 12 can, for example, have three rails 47 respectively located in the lower part, the upper part and in an intermediate zone of the intermediate wall 42.

Referring to FIG. 5, the intermediate wall 42 is preferably wavy, with each undulation defining a trough 50. Thus, two successive troughs 50 are open in two opposite directions. In such a configuration, the rails 47 of one of the walls, either the first wall 41 or the second wall 43, are lodged in the open troughs 50 in the direction of the seat 13, and the rails 47 of the other wall, either the first wall 41 or second wall 43, are placed in the troughs 50 in the direction of the aisle 21.

In this example, the first wall 41 can be located on the inner side, i.e. the side facing the seat 13, and second wall 43 is located on the outer side, i.e. toward the aisle 21.

The structure described above can of course be reversed, i.e. the first wall 41 can be located on the outside and the second wall 43 can be located on the inside.

According to another example embodiment, a cover 53 can extend above the rail 47. The mask 53 makes it possible to avoid the risk of pinching fingers when the passenger handles the first wall 41 and/or the second wall 43.

As an example, the intermediate wall 42 can consist of a portion of the rigid shell 33 or it can be a wall that is inserted with respect to the rigid shell 33 and that can be assembled or attached to the rigid shell 33. The intermediate wall 42 can also be attached to the side panel 32.

Figure 8:
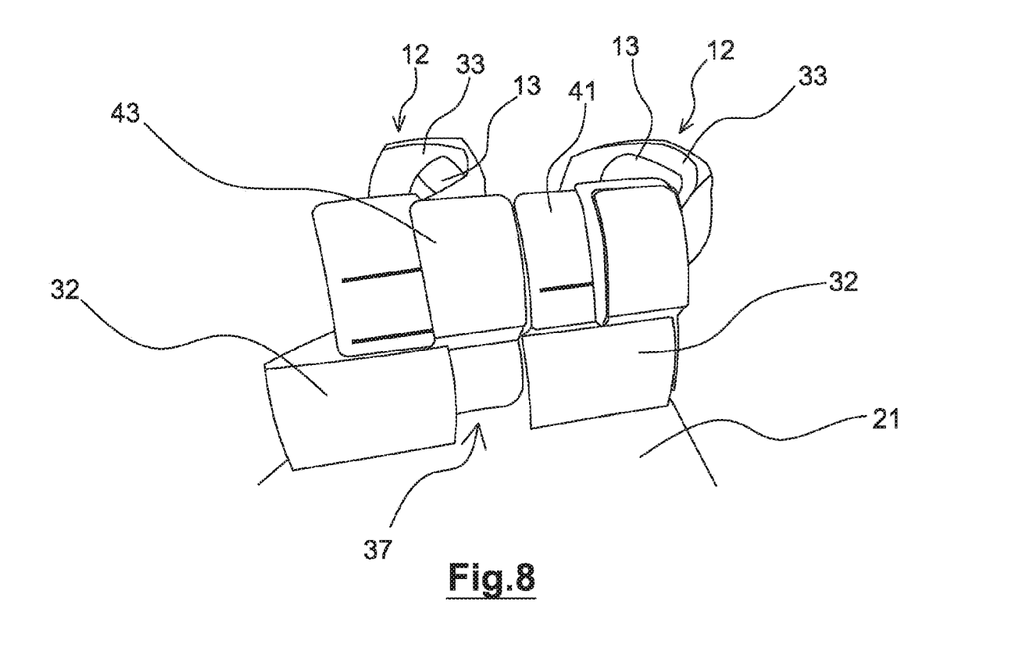
FIG. 8 is a perspective side view of an alternative embodiment of the means of closing that can be placed, in the stowed position, in a side panel of the seat according to the present invention.

In the embodiment of FIG. 8, a lower part of the second wall 43 is placed in the side panel 32 when the second wall 43 is in the "stowed" position.

Alternatively, the first wall 41 and the second wall 43 can be movable in a rotational manner, in particular about an axis that is nearly perpendicular to the longitudinal axis X1 of the airplane cabin 10, or in a combined movement comprising at least one translation and at least one rotation.

The advantage of having of a separate first wall 41 and a second wall 43 lies in fact that the probability that the first wall 41 and/or of the second wall 43 will display simultaneous dysfunctions is very low, so that the passenger will be always be able to move at least either the first wall 41 or the second wall 43 so as to reach the aisle 21, in particular in the event of a dangerous situation requiring evacuation the airplane.

Figure 10:
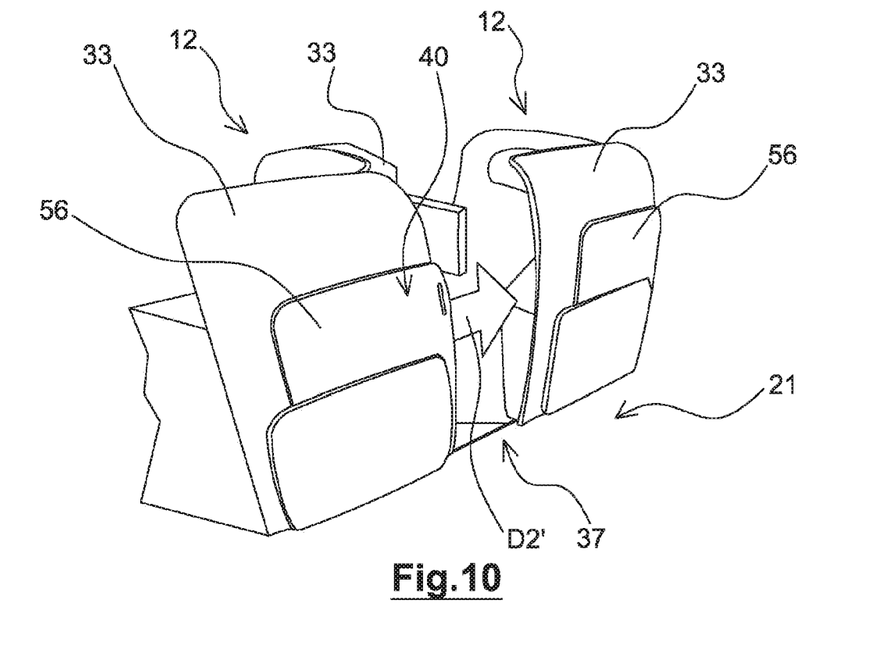
FIGS. 10 and 11a to 11b are perspective side views of a second embodiment of the means of closing with a single wall according to the present invention.
Figure 11A:
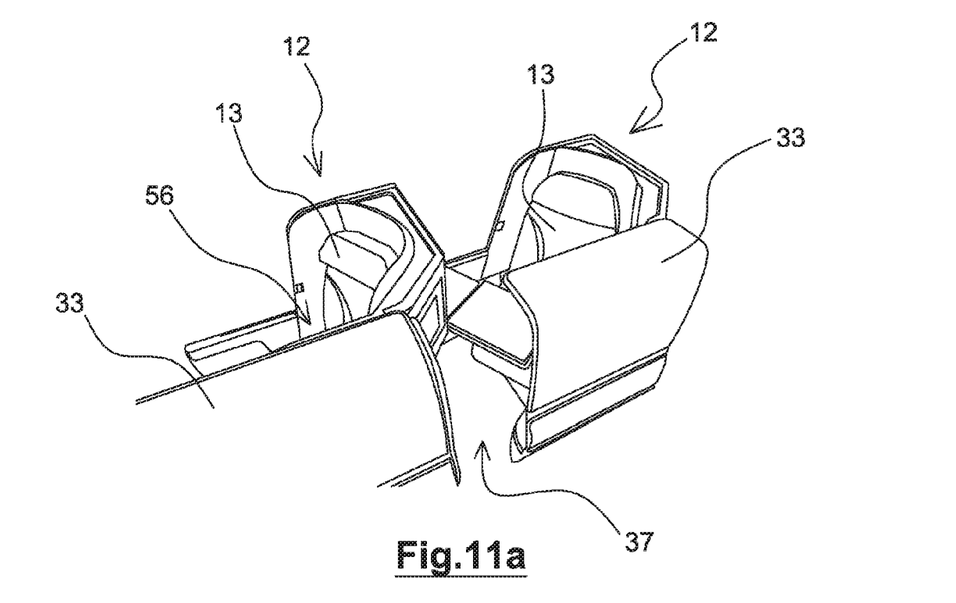
Figure 11B:
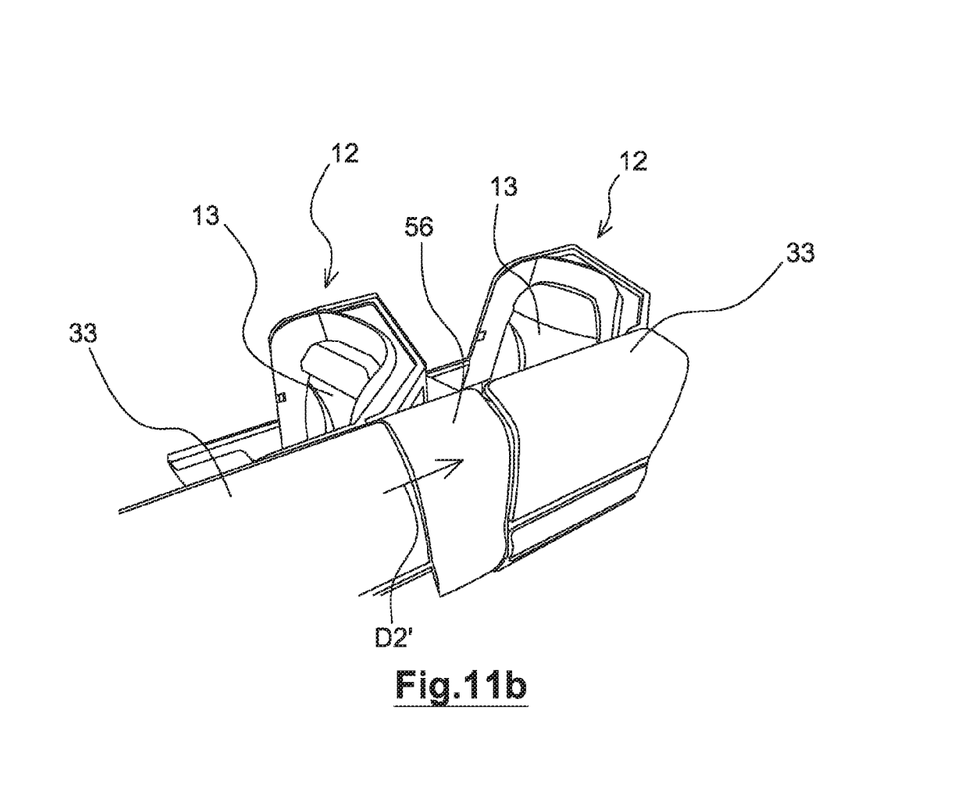

In the embodiment of FIGS. 10, 11a, and 11b, the means of closing 40 comprise a single wall 56 to provide for the closing of the passage 37 that is interposed between two consecutive seats 12 of a line of seats 12.

According to a first alternative, the single wall 56 can slide between a "stowed" position, in which the single wall 56 at least partially overlaps the rigid shell 33 of the "front" seat 12, and a "deployed" position, in which the single wall

56 closes off the transverse passage 37 between the "front" seat 12 and the of "back" seat 12, as shown in FIGS. 10, 11*a* and 11*b*.

According to a second alternative that is not shown, the single wall 56 can slide between an "stowed" position in which the single wall 56 at least partially overlaps the rigid shell 33 of the "back" seat 12, and a "deployed" position in which the single wall 56 closes off the transverse passage 37 between the "front" seat 12 and the "back" seat 12.

The height of the single wall 56 can be adjusted as needed. Thus, in the embodiment of FIG. 10, the height of the single wall 56 is lower than that of the rigid shell 33, while, in the embodiment of FIGS. 11*a* and 11*b*, the height of the single wall 56 is about equal to that of the of the rigid shell 33.

According to the examples shown, the single wall 56 moves in a direction of translation D2', advantageously parallel to the longitudinal axis X1 of the airplane cabin 10, corresponding to the longitudinal direction of the airplane.

Alternatively, the single wall 56 can be movable in a rotational manner, in particular about a nearly horizontal axis, a nearly vertical axis, or an axis forming an angle with the longitudinal axis X1, or a combined movement comprising at least one translation and at least one rotation.

Figure 12:
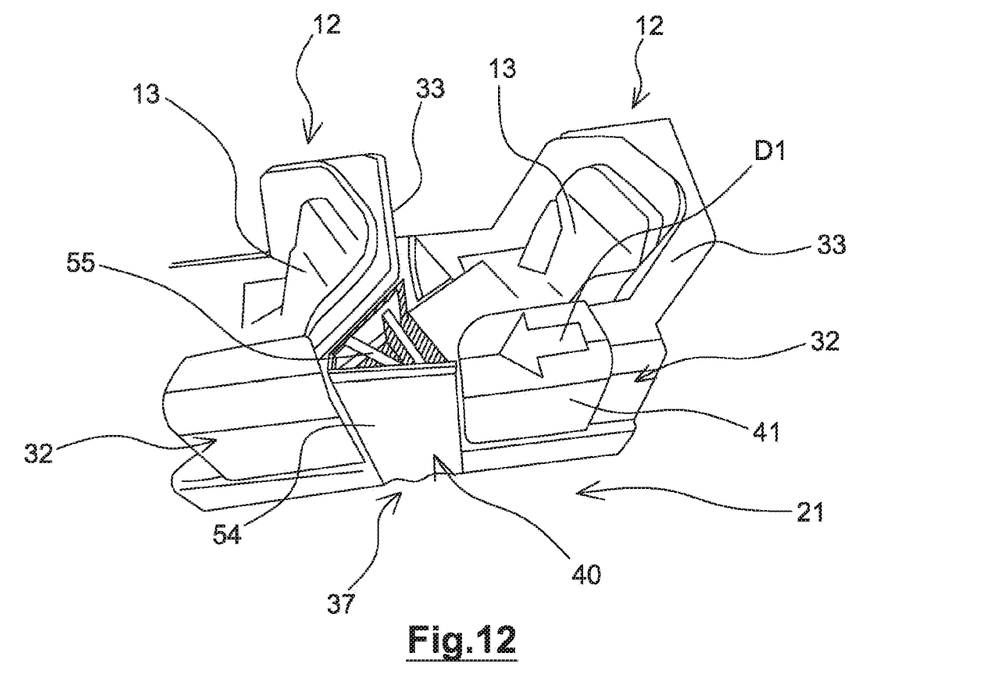
FIG. 12 is a perspective side view of a third embodiment of the means of closing with blackout curtains according to the present invention.

In the embodiment of FIG. 12, the first, in particular sliding, wall 41 can close off the space above the side panel 32. In this example embodiment, the second wall 43 is replaced by a blackout curtain 54 mounted on a support 55.

The support 55 is advantageously articulated and movable between
- a "stowed" position in which the curtain 54 is located inside the "front" seat 12, for example inside the rigid shell 33 of the "front" seat 12, and
- a "deployed" position, in which the curtain 54 closes off all or a part of the transverse passage 37, as shown in FIG. 12.

To allow for the transition from the "stowed" position to the "deployed" position, the support 55 should be movable with respect to the "front" seat 12 in a translational and/or rotational manner.

Figure 13:
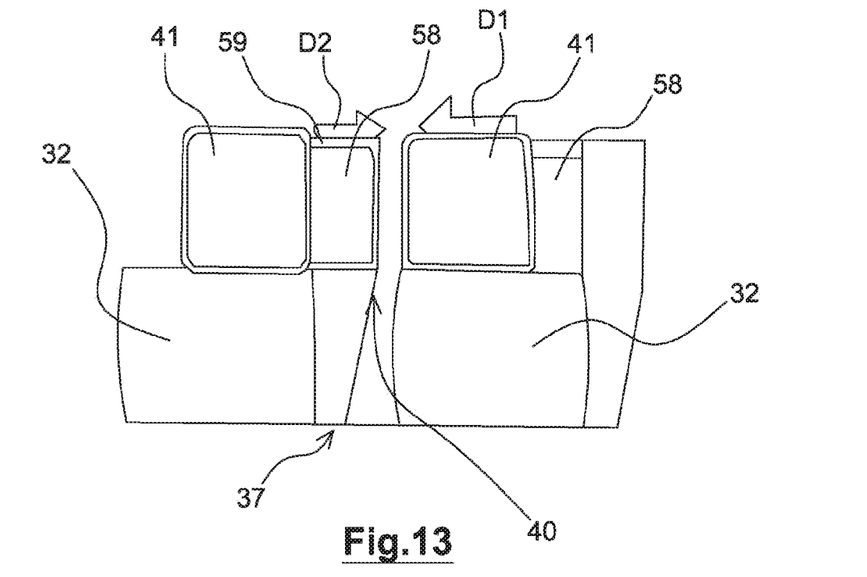
FIG. 13 is a side view of a fourth embodiment of the means of closing with blackout curtains according to the present invention.

In the embodiment of FIG. 13, the first, in particular sliding, wall 41 is able to closes off the space above the side panel 32. In this example embodiment, the second wall 43 is replaced by a curtain 58 mounted on a frame 59.

The frame 59 is advantageously articulated and movable in the direction D2, between:
- a "stowed" position, in which curtain 54 is located inside the "front" seat 12, for example inside the rigid shell 33 of the "front" seat 12, and
- a "deployed" position, in which the curtain 54 closes off all or a part of the transverse passage 37.

To this end, the frame 59 should be U-shaped, with two arms that can slide inside the "front" seat 12 unit, in particular inside the intermediate wall 42.

According to an alternative embodiment of the particular example embodiments of FIGS. 12 and 13, when it is in the "deployed" position the curtain 54 closes off all or a part of the space between the intermediate wall 42 of the "front" seat 12 and the first wall 31.

Figure 14:
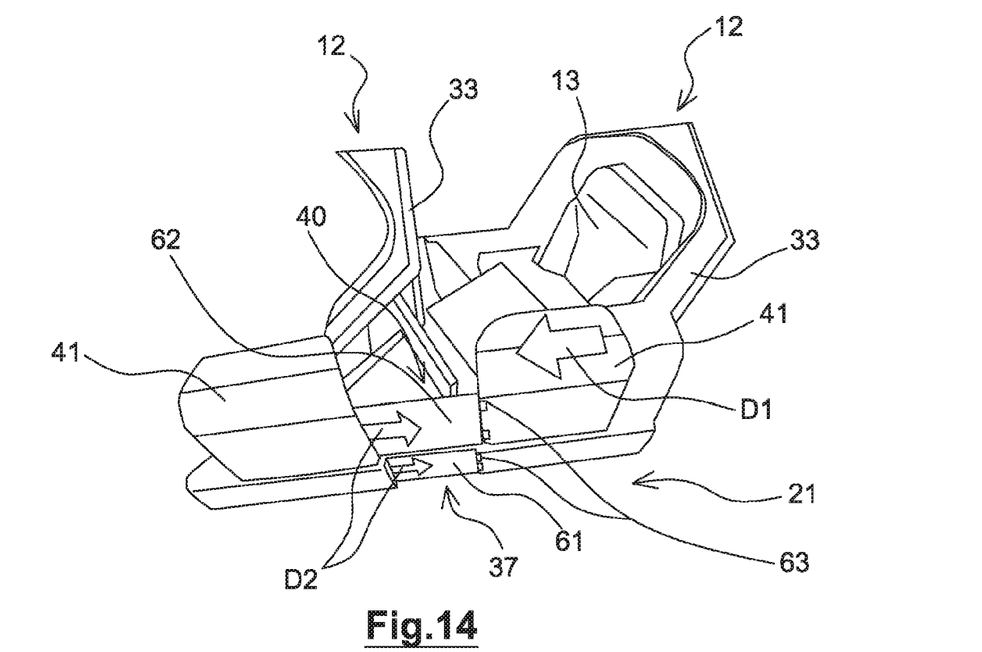
FIG. 14 is a side view of a fifth embodiment of the means of closing with blackout curtains according to the present invention.

In the embodiment of FIG. 14, the first, in particular sliding, wall 41 can close off the space above the side panel 32. In this example embodiment, the second wall 43 is replaced by at least one first curtain 61, in particular a first curtain 61 and a second curtain 62.

The first curtain 61 and/or the second curtain 62 can advantageously be rolled up and is (are) set up in the "front" seat 12.

When it is unrolled in the direction D2, the first curtain 61 allows at least part of the transverse passage 37, in particular a lower part of the transverse passage 37, to be closed off. In addition or alternatively, the second curtain 52, when it is unrolled in the direction D2, makes it possible to close off at least a part of the transverse passage 37, in particular an upper part of the transverse passage 37.

The first curtain 61 and/or the second curtain 62 can be kept in the "unwound" state by means of a system 63 for fastening the loose end of the first curtain 61 and/or the second curtain 62 to a wall of the "back" seat 12. The fastening system 63 can be a system with hooks or magnets.

The first curtain 61 and/or the second curtain 62 can alternatively be made of an extensible material.

According to another alternative embodiment, the first curtain 61 can be set up in the "back" seat 12. The second curtain 62 can likewise be set up in the "back" seat 12. The first curtain 61 and second curtain 62 are alternatively set up in separate seats 12.

Figure 15A:
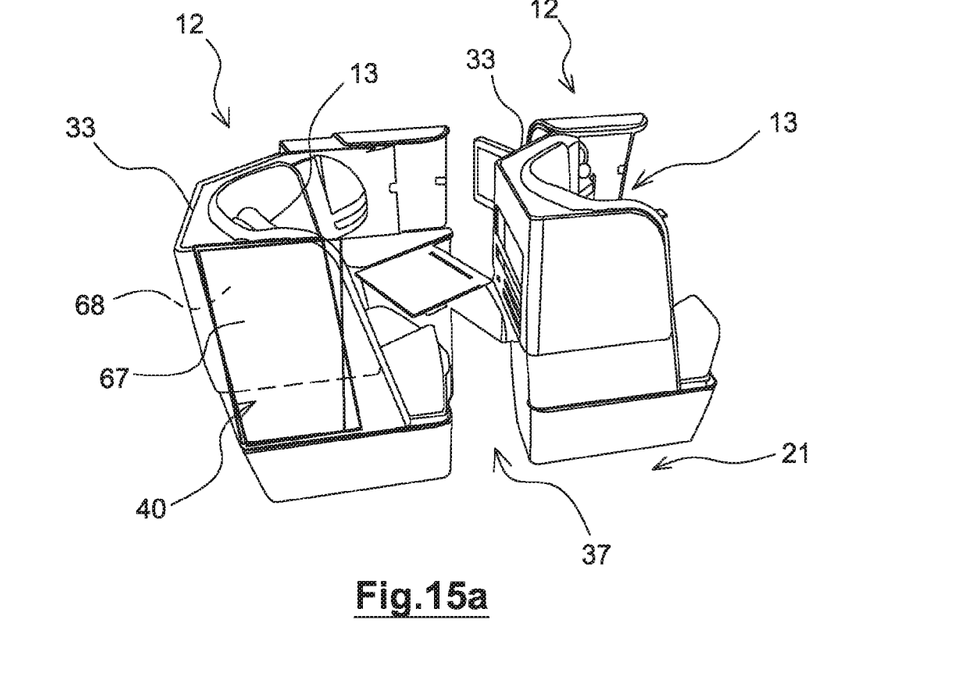
FIGS. 15a and 15b are perspective side views illustrating a sixth embodiment of the means of closing according to the present invention comprising two interdependent walls that are movable with respect to each other in the same direction of deployment.
Figure 15B:
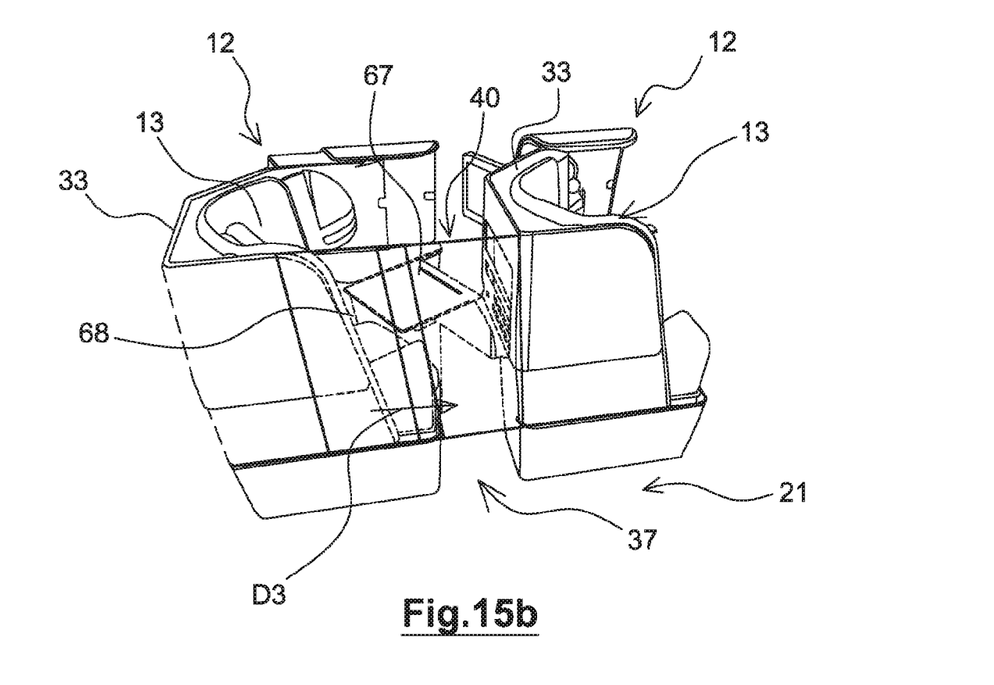

In the embodiment of FIGS. 15*a* and 15*b*, the means of closing 40 comprise at least two advantageously interdependent walls 67, 68 that are movable with respect to one another. In other words, the walls 67, 68 are connected to each other with at least one degree of freedom.

The walls 67, 68 are
- disposed in the "front" seat 12 in an "stowed" position, in particular in the rigid shell 33 of the "front" seat 12,
- deployed in the "deployed" position along the same deployment direction D3 so as to close off the transverse passage 37 between two seats 12, as shown in the FIGS. 15*a* and 15*b*.

Figure 16A:
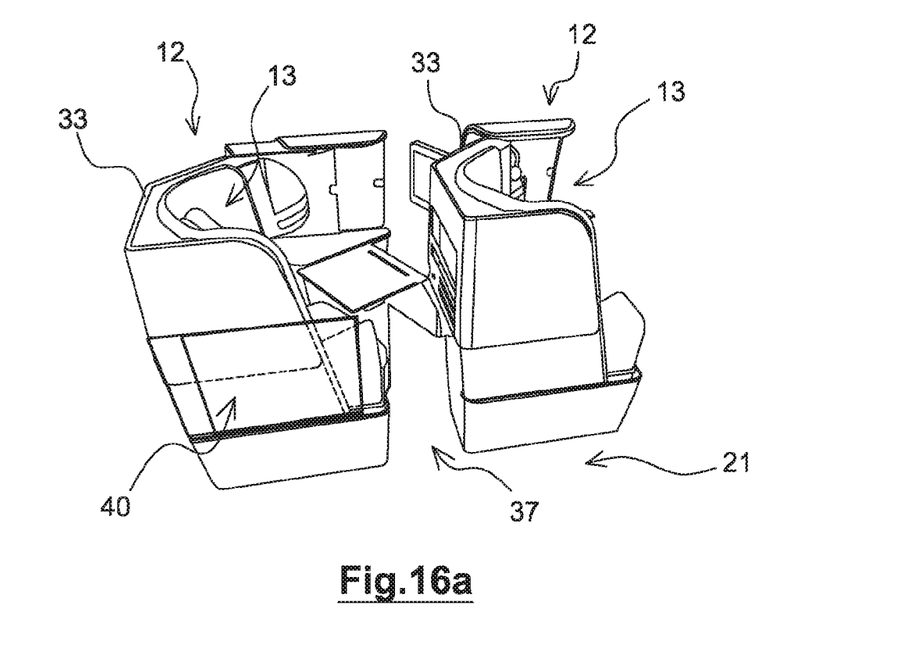
FIGS. 16a to 16c are perspective side views illustrating a seventh embodiment of the means of closing according to the present invention comprising two interdependent walls that are movable with respect to each other in two distinct directions of deployment.
Figure 16B:
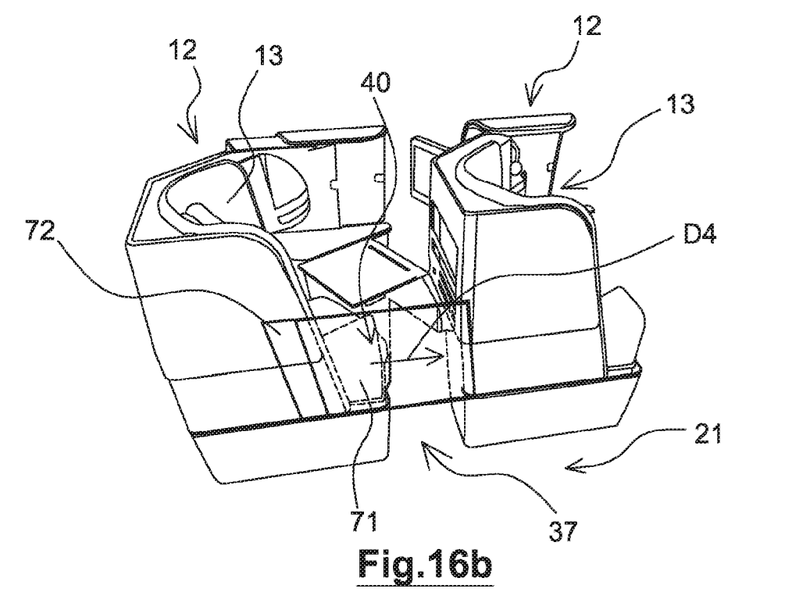
Figure 16C:
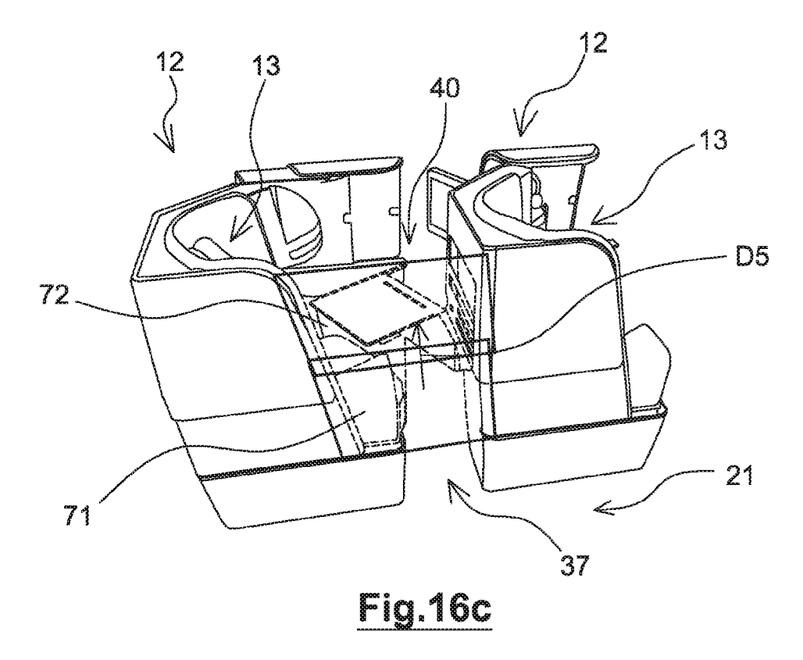

In the embodiment of FIGS. 16*a* to 16*c*, the means of closing 40 comprise at least one first wall 71 and one second wall 72, which are advantageously interdependently movable with respect to one another. In other words, the first wall 71 and the second wall 72 are connected with each other with at least one degree of freedom.

The first wall 71 and the second wall 72 are
- disposed in the "front" seat 12 in the "stowed" position, in particular in the rigid shell 33 of the "front" seat 12,
- deployed in the "deployed" position along two different deployment directions.

The first wall 71 can thus be moved along with the second wall 72 in first deployment direction D4, in particular parallel to the longitudinal axis X1 of the airplane cabin 10, so as to close off at least a part of the transverse passage 37, in particular a lower part of the transverse passage 37, as shown in FIG. 16*b*. For example, the first wall 71 can be displaced along a horizontal translational direction.

The second wall 72 can be moved with respect to the first wall 71 along a second deployment direction D5, in particular a vertical direction, in order to close off at least a part of the transverse passage 37, in particular an upper part of the transverse passage 37, as illustrated by FIG. 16*c*. For example, the second wall 72 can be displaced along a vertical translational direction.

It should be noted that the present invention is not limited to a cabin layout wherein each seat 13 is oriented towards the aisle 21 of the airplane cabin 10. It also includes any layout of an airplane cabin 10 wherein there is a transverse passage 37 located between two seats 12 that are disposed one behind the other along a longitudinal axis X1 of the airplane cabin 10, allowing for direct access to the aisle 21.

It is thus also applicable to seat arrangements in which the seats are turned in a direction opposite to the aisle 21 (a configuration called "herringbone").

The invention can also be implemented with seats installed in other means of transportation, such as for example the seats of buses, trains, or boats.

The invention is self-evidently not limited to the embodiments described above and only provided as examples. It includes various modifications, alternative forms and other alternatives which a person skilled in the art can envision within the scope of this invention and in particular any combination of the various operating modes described above taken separately or in combination.

The invention claimed is:

1. A seating arrangement comprising:
   at least one front seat and at least one rear seat, wherein the at least one rear seat is located behind the at least one front seat along a longitudinal axis of an airplane cabin wherein at least one of the at least one front seat or the at least one rear seat is convertible between a seated position and a bed position,
   a transverse passage disposed between the at least one front seat and the at least one rear seat so as to allow access to an aisle,
   wherein the seating arrangement includes a movable closing mechanism that is configured to at least partially close off the transverse passage when the movable closing mechanism is deployed,
   wherein the movable closing mechanism comprises a first wall and a second wall, wherein each wall is installed so that each wall is movable relative to at least one of the at least one front seat or the at least one rear seat,
   where the first wall is deployable along a first direction between
     a stowed position, and
     a deployed position in which the first wall closes off at least a part of the transverse passage between the at least one front seat and the at least one rear seat,
   wherein the second wall is deployable along a second direction between
     a stowed position, and
     a deployed position, in which the second wall closes off at least a part of the transverse passage between the at least one front seat and the at least one rear seat,
   wherein an intermediate wall is positioned between the first wall and the second wall such that the first wall is positioned adjacent a first side of the intermediate wall, and the second wall is positioned adjacent an opposing side of the intermediate wall, wherein the intermediate wall comprises a portion of a rigid shell of at least one of the at least one front seat or the at least one rear seat,
   wherein the intermediate wall comprises two adjacent troughs that are open in opposing directions,
   wherein at least one of the first wall or the second wall is connected to at least one slide cooperating with a first rail that is positioned in one of the two adjacent troughs that is open in a direction of the at least one front seat and the at least one rear seat, and
   wherein at least one of the first wall or the second wall is connected to at least one slide cooperating with a second rail that is positioned in one of the two adjacent troughs that is open in a direction opposite to the at least one front seat and the at least one rear seat.

2. The seating arrangement according to claim 1, wherein each of the at least one front seat and the at least one rear seat is arranged at an angle relative to the longitudinal axis of the airplane cabin and in a direction toward an aisle of the airplane cabin.

3. The seating arrangement according to the claim 1, wherein the movable closing mechanism comprises at least one sliding wall.

4. The seating arrangement according to claim 1, wherein the second direction of deployment of the second wall is opposite the first direction of deployment of the first wall.

5. The seating arrangement according to claim 1, wherein at least one of the first wall or the second wall is connected to at least one slide cooperating with a rail that is affixed to the intermediate wall.

6. The seating arrangement according to claim 1, wherein a cover extends above at least one of the first rail or the second rail so as to avoid a risk of pinching fingers when at least one of the first wall or the second wall is handled.

7. The seating arrangement according to claim 1, wherein at least one of a lower part of the first wall or the second wall is placed in a side panel of the at least one front seat or the at least one rear seat when at least one of the first wall or the second wall is respectively in the stowed position.

8. The seating arrangement according to claim 1, wherein the first wall and the second wall are deployable with a rotational movement, a translational movement, or a combined movement comprising at least one translational movement and at least one rotational movement.

9. The seating arrangement according to claim 1, wherein the movable closing mechanism comprises at least one blackout curtain.

10. The seating arrangement according to claim 9, wherein the at least one blackout curtain is mounted on an articulated support that is deployable between
    a stowed position, in which the at least one blackout curtain is located inside the at least one front seat, and
    a deployed position, in which the at least one blackout curtain closes off at least a part of the transverse passage between the at least one front seat and the at least one rear seat.

11. The seating arrangement according to claim 10, wherein the articulated support deploys with a translational movement and a rotational movement with respect to the at least one front seat when the at least one blackout curtain deploys from the stowed position to the deployed position.

12. The seating arrangement according to claim 9, wherein the at least one blackout curtain is mounted on a frame that is deployable between
    a stowed position, in which the at least one blackout curtain is located inside the at least one front seat, and
    a deployed position, in which the at least one blackout curtain closes off at least a part of the transverse passage between the at least one front seat and the at least one rear seat.

13. The seating arrangement according to claim 1, wherein the movable closing mechanism comprises at least one of a first curtain or a second curtain;
    wherein the at least one first curtain or second curtain comprises a rolled position and an unrolled position;
    wherein, in the rolled position, the at least one first curtain or second curtain is insertable into the front seat; and
    wherein, in the unrolled position, the at least one first curtain or second curtain closes off at least a portion of the transverse passage between the at least one front seat and the at least one rear seat.

14. The seating arrangement according to claim 1, wherein the first wall and the second wall are movable with respect to one another with at least one degree of freedom.

* * * * *